June 7, 1966 D. G. FALCONER 3,254,837

FLUID SEALING DEVICE AND ANALOGUE COMPUTER COMPONENTS

Filed March 5, 1964 6 Sheets-Sheet 1

June 7, 1966 D. G. FALCONER 3,254,837

FLUID SEALING DEVICE AND ANALOGUE COMPUTER COMPONENTS

Filed March 5, 1964 6 Sheets-Sheet 3

June 7, 1966 D. G. FALCONER 3,254,837

FLUID SEALING DEVICE AND ANALOGUE COMPUTER COMPONENTS

Filed March 5, 1964 6 Sheets-Sheet 5

FLUID SEALING DEVICE AND ANALOGUE COMPUTER COMPONENTS

Filed March 5, 1964 6 Sheets-Sheet 6

United States Patent Office 3,254,837
Patented June 7, 1966

3,254,837
FLUID SEALING DEVICE AND ANALOGUE COMPUTER COMPONENTS

David G. Falconer, 3931 Benton St. NW., Washington, D.C.
Filed Mar. 5, 1964, Ser. No. 349,666
14 Claims. (Cl. 235—200)

This invention relates to hydraulic and pneumatic computers in general but particularly to a sealing device and piston, the latter of which may vary in shape and size, while the former will move to accommodate the area change of the piston. Certain species are shown which operate conversely to the above; i.e., the cylinder containing the fluid varies in shape and size while the piston contains the sealing device which moves with its stroke to allow for a change in area.

It is believed that that this invention contributes substantially to the art in a number of respects. In the first place, the principle underlying the components is inherently simple—the comparison of areas of pistons and cylinders of closely controllable shapes which do not encounter rubbing or sliding friction because the novel sealing device does not have to physically contact the piston to form an interface or plane which constitutes the pressure area. The wear on the piston and seal is therefore negligible. The response time of the device is consequently excellent; moveover, since friction and wear are usually relatively unpredictable factors, the absence of sliding contact aids in making the performance of the components reliable and predictable.

Other objects and advantages of the invention, if not obvious, will be pointed out in the specification and description connected with the various species and figures. It will be apparent that there are so many permutations possible by arranging the various species in different ways that they can not be illustrated in this disclosure, which will be confined to performing simple tasks such as extracting the square root or cube root. Fundamentally, the functions anticipated for the device consist of transmitting displacement or travel of the piston into a pressure value and vice versa.

The following drawings are use in this disclosure:

Reference should now be made to the drawings.

Figures 1, 2, 3, 4:
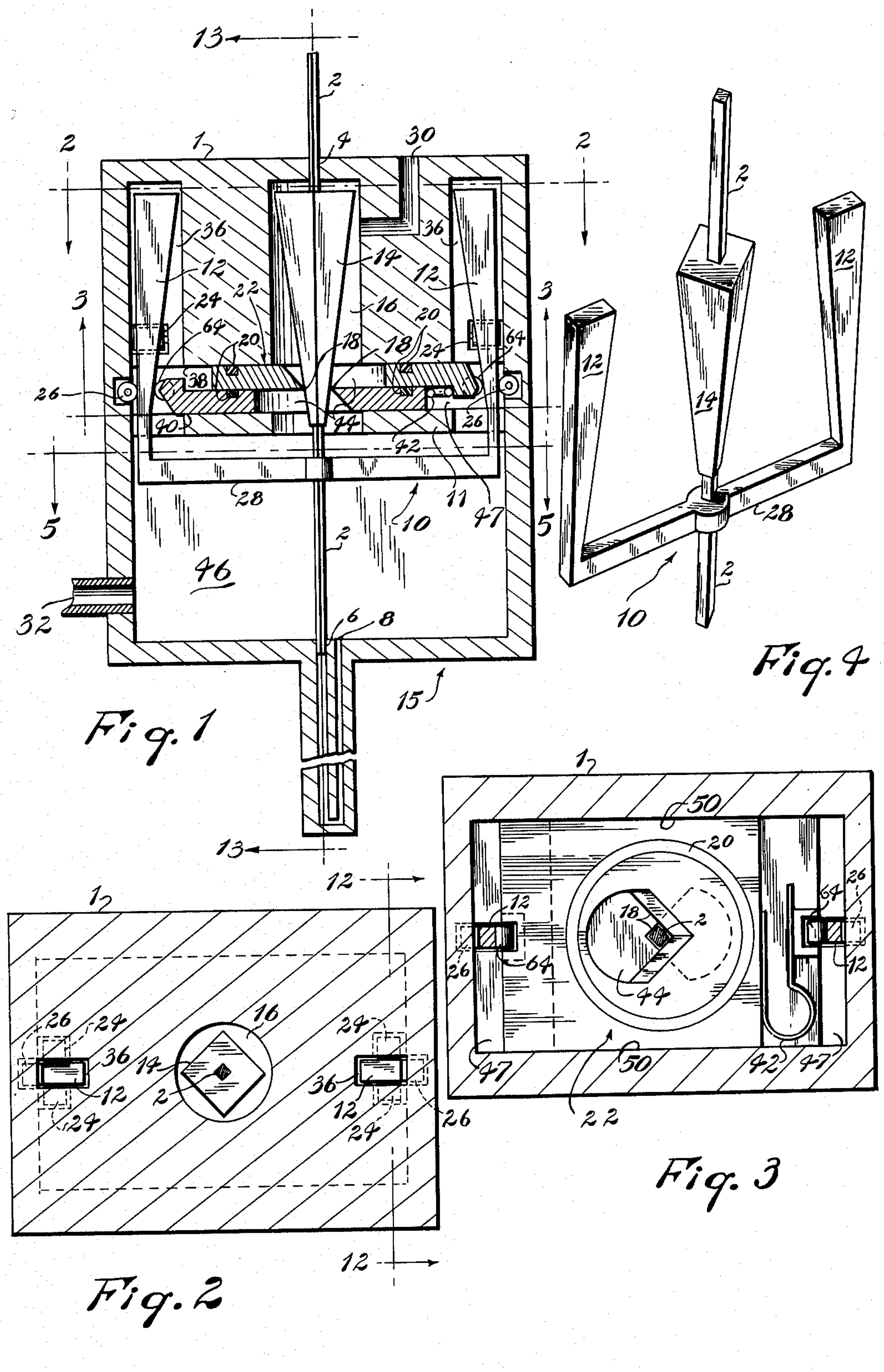
FIG. 1 is a conventional section through the middle of piston and cylinder of a preferred species of the invention.
FIG. 2 is a section taken along the lines 2—2 of FIG. 1.
FIG. 3 is a section taken along the lines 3—3 of FIG. 1.
FIG. 4 is a perspective view of the pyramid-shaped piston made integral to cams for actuation of sealing jaws.
Figures 12, 13, 14:
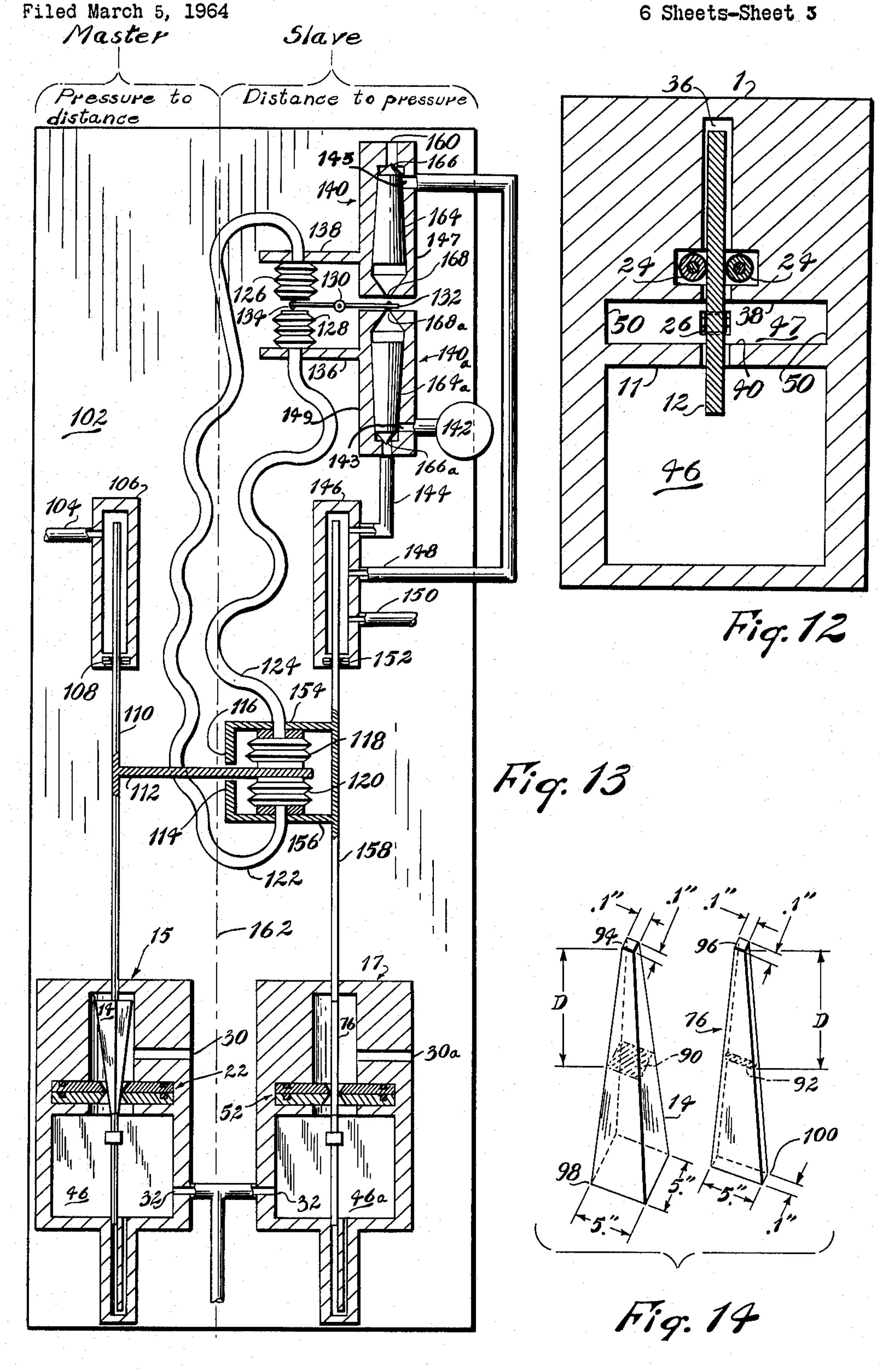
FIG. 12 is a section taken along the lines 12—12 of FIG. 2.
FIG. 13 is a section taken along the lines 13—13 of FIG. 1 and in addition taken through the middle of an assembly of which it is a component, all of which are mounted upon a board or chassis.
FIG. 14 is a diagrammatic perspective drawing of a pyramidal-shaped piston placed alongside a wedge-shaped piston of the same profile. This drawing is used to illustrate the mathematical relationship and basis of the computer.

In FIG. 1 a housing 1 contains a bearing 4 to receive a reciprocating shaft 2; the shaft 2 is square in cross-section. Although not shown, a seal may be provided in the bearing 4 if necessary. At the opposite end of the shaft 2 another bearing 6 is provided. This bearing 6 is "blind," does not penetrate the wall of the housing 1, but a conduit 8 leads from the interior of the bearing 6 to the chamber 46. Entrapped gas or fluid will therefore be prevented from any compression effects when the shaft 2 reciprocates. Mounted on the shaft 2 in a co-axial and fixed position is a pyramid-shaped piston 14. The piston 14 may be molded of plastic such as nylon or made of metal; obviously it should be as light as possible. If a liquid is used as an operational medium the piston 14 may be counter-balanced by manufacturing it in a hollow sealed, form an approach to the same density of the liquid medium may thus be made. A cross-arm 28, fixed to the shaft 2 is attached to two cams 12, one on each side of the shaft 2 and running parallel to it in the same plane. Reference to FIG. 4 should make this structure clear. In FIG. 4 reference numeral 10 refers generally to the shaft 2, the cross-arm 28 and the piston 14, which may be called a "function generator." Since the piston 14 is presently shown to be a pyramid it is apparent that the area of a plane which cuts it normally to its axis will vary as the square of the width of its side at the cutting plane. The piston 14 may be unfastened from the function generator 10 and in its stead a piston of another shape or size may be fastened to the shaft 2. Since the area of the new shaped piston will vary in a different ratio or to different values it will be seen that another function generator is made by the interchange of pistons. FIG. 14 makes a graphical comparison of two pistons 14, the pyramid, and a wedge shaped piston 76. It will be evident from FIG. 14 that profiles of the two pistons 14 and 76 are congruent and that in piston 76 a plane 92 taken at distance "D" from the small end is equal to the square root in area to the area of plane 90 in piston 14 which is also taken at distance "D" from the small end. However, the cams 12 of the function generator 10 must be made to fit the circumstances of the requirements, as will be explained later.

In FIG. 1 it will be noticed that the piston 14 is oriented in such a position that it is seen diagonally and that the cams 12 have a profile which is congruent with respect to gradient to the diagonal profile of the piston 14; however, the cams 12 are inverted.

The function of the cams 12 is to open or close a piston sealing device generally indicated by reference numeral 22 and this function will be seen in the following description to form the nexus upon which the use of variously shaped pistons may be made usable in mathematical devices and amplifiers.

In FIG. 1 two cavities 36 are provided within the housing 1 which provide a closed area or volume in which the cams 12 may reciprocate. In like manner a cavity 16 is provided for the piston 14.

Figures 5, 6, 7, 8, 9, 10, 11:
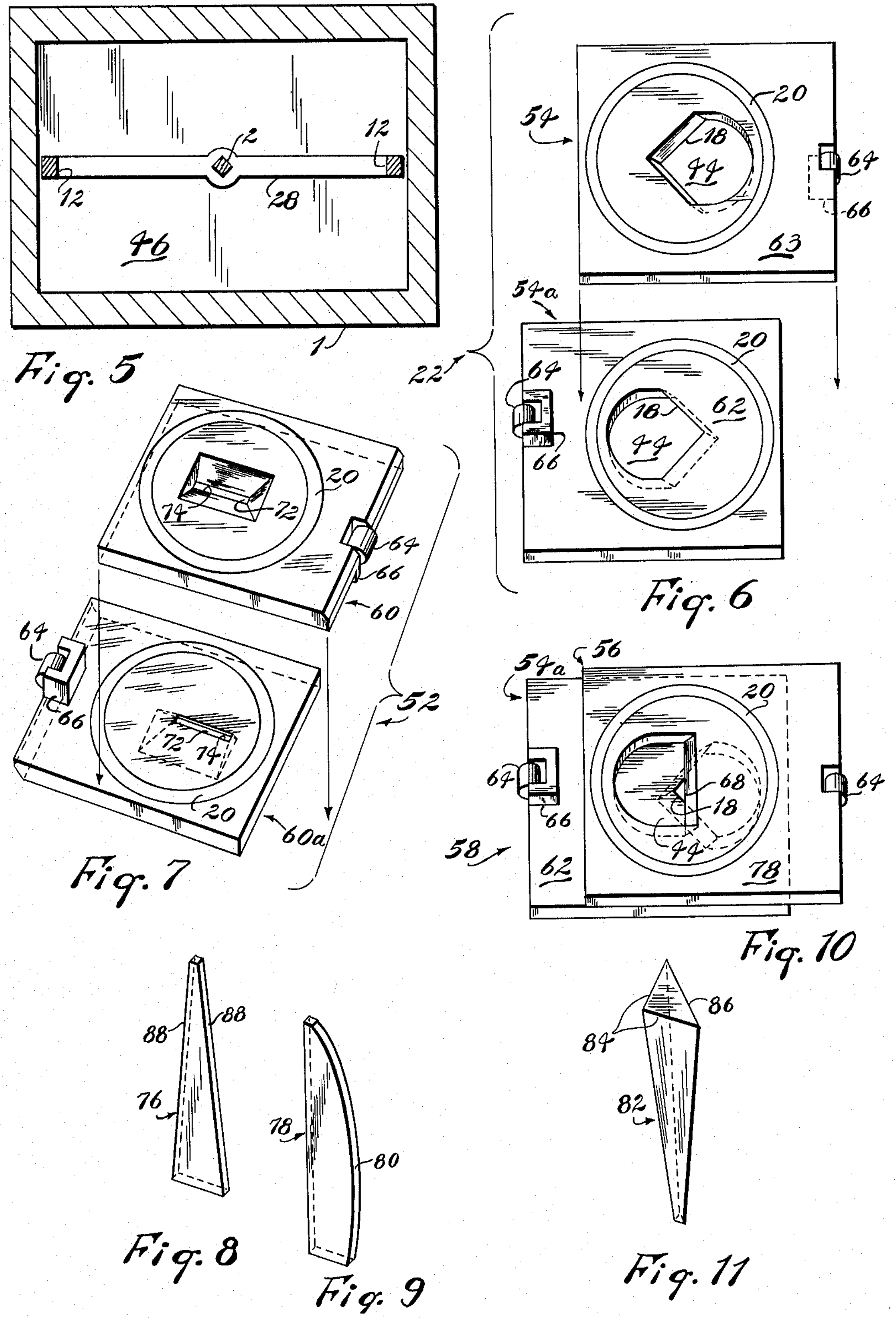
FIG. 5 is a section taken along the lines 5—5 of FIG. 1.
FIG. 6 is an "exploded" perspective view of two mating piston seals used in FIG. 1.
FIG. 7 is an "exploded" perspective view of two mating seals used in the type of device of FIG. 1 when a wedge-shaped piston is used in place of the pyramid shown in FIG. 1.
FIG. 8 shows the wedge-shaped piston which may be used in FIG. 7.
FIG. 9 shows a wedge-shaped piston similar to that of FIG. 8 except that one side is straight while the opposite side is formed to some curve having a mathematical significance or value.
FIG. 10 is a perspective view of two mating seals which are similar to those shown in FIG. 6 except that they are intended to seal a piston which is triangular in cross-sectional shape.
FIG. 11 shows a perspective view of a piston which is intended to operate in conjunction with the seals shown in FIG. 10. This piston is triangular in cross-section and is generally tapering along its longitudinal axis.

Rollers 26 and 24 recessed into the housing 1 provide support in three directions for the cams 12; these rollers may be seen in different aspect in FIG. 2. The seal 22 operates within a slot 47 which is formed in the housing 1, a lower portion or wall of which, is shown by reference numeral 11. Reference should be made to FIG. 6 which shows the seal 22 in "exploded" perspective; here it will be seen that two plates 54 and 54*a* which are almost alike are placed against each other, the downward side of plate 54 facing the upward side of plate 54*a*. The difference between the two plates lies in the fact that the upward side 63 of plate 54 is grooved and has a sealing ring 20 fitted in the groove. The same kind of sealing ring 20 is fitted into a groove in the upper surface 62 of the plate 54*a*. The sealing rings should be composed of Teflon or some low coefficient of friction material. The ring 20 in the plate 54 thus seals the plate from the housing 1 or the upper surface 38 of the groove 47 while the sealing ring 20 in the plate 54*a* seals the two plates 54 and 54*a* from each other. Each plate 54 and 54*a* is provided with a roller 64 which is in turn fitted on a shaft in a boss or projection of the plate. Each of the plates 54 and 54*a* also have an aperture 44 through which the piston 14 may move; the curved part of the aperture is merely for clearance. The angular part 18 is a knife edge the angle of which is equal to 90° to mate with the piston 14. These knife edges constitute an interface or sealing area with the piston.

Referring again to FIG. 1 it will be seen that the knife edges 18 on the sealing plate 54 are downward while the knife edges 18 on the lower plate 54*a* are upward; both sets of knife edges 18 are therefore at the center, i.e., are in the same plane as the contiguous surfaces of the plates 54 and 54*a*. The rollers 64 contact the cams 12. A hair spring 42 is compressed between the boss 66 of plate 54 and the end of 54*a*, thus exerting a force which presses the plates 54 and 54*a* outward so that the rollers follow the contours of the cams 12. The hair spring 42 may be seen in FIG. 1 and in FIG. 3. The sealing plates 54 and 54*a* are constrained to move in a straight line or path by the walls 50 of the groove 47 as shown in FIG. 3; they are also constrained by the walls 38 and 40 of the groove 47 as shown by FIG. 1.

It should be clear from the foregoing description that as the piston 14 reciprocates that the sealing mechanism 22 will open or close in unison with the increase or decrease of the width, and hence, with the area of the plane bounded by or described by the knife edges 18 of the sealing mechanism. The concept of this part of the invention is that the knife edges 18 will seal the area required to be sealed so that there is very little leakage; no attempt is made in this species (generally described by reference numeral 15) to prevent leakage altogether. It is anticipated that a space of a width of .0005" will exist between the walls of the piston 14 and the knife edges 18; but this is a calculated evil which moreover will not worsen to more than a negligible amount. The only actual wear occurring on the knife edges 18 would be from the fluid particles escaping through the small space. The other wear would occur on the rollers 64 and the rise of the cams 12; this would be expected to be negligible since the forces are light and the areas may be made ample, with hardened surfaces.

In operation the species 15 of FIG. 1 may be described as follows: If, for instance a source of compressed gas is regulated to a certain pressure and is conducted into the chamber 46 through the inlet 32 the piston 14 will exert a force upwards which will vary as the square of the dimension of one side of the piston at the position of the interface or knife edge 18 of the seal. The effect of this is the same as if a mechanical spring, when compressed, would vary as the square of the displacement instead of approximating Hooke's law. If the piston 14 were to be inverted with respect to that shown in FIG. 1 along with the cams 12 the force exerted by the piston would diminish, naturally, but according to the square as described above.

Figures 18, 19, 20:
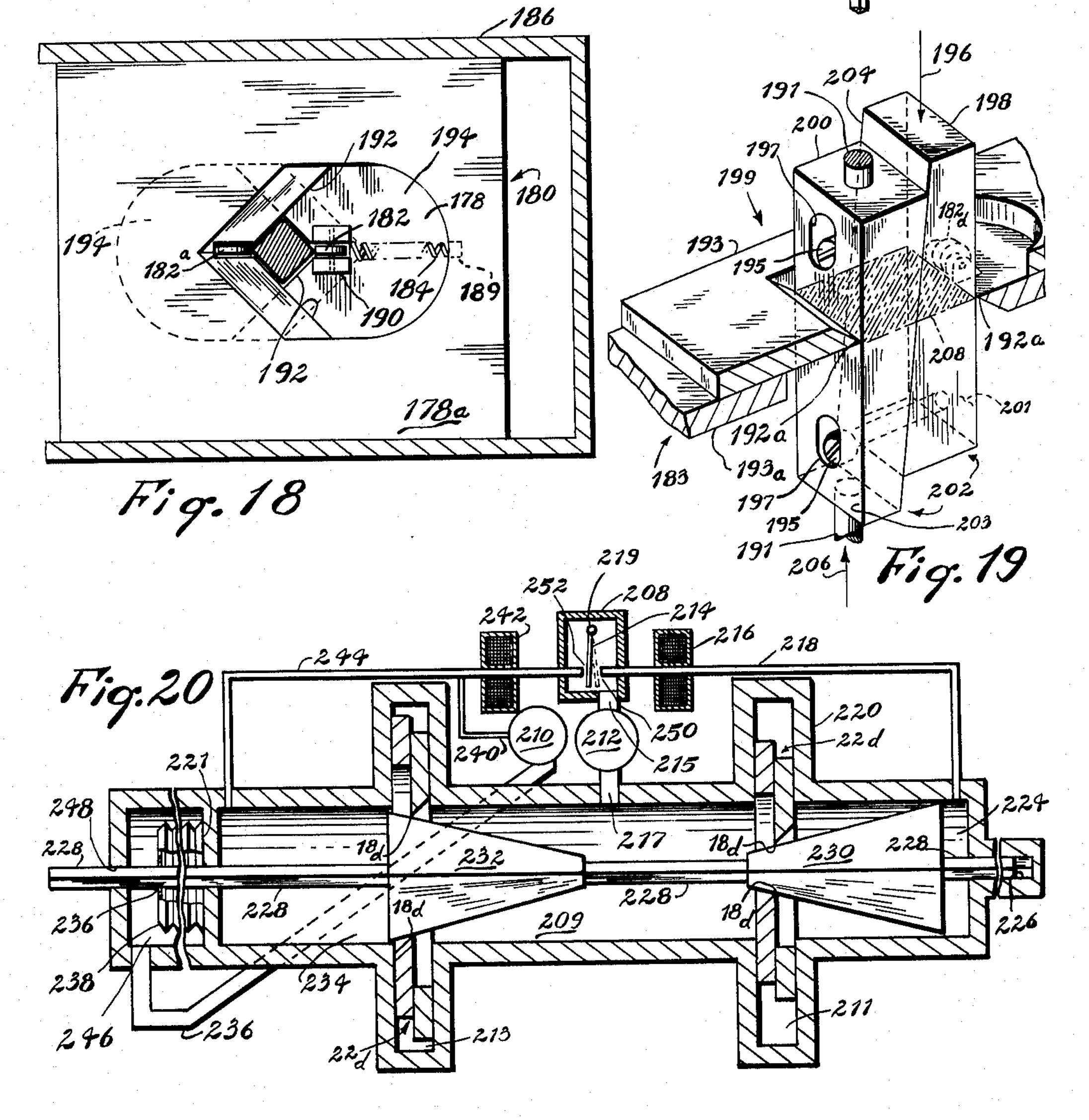
FIG. 18 is a section taken along the lines 18—18 of FIG. 16.
FIG. 19 is a perspective view of another type of piston of rectangular cross section. This view is broken away, showing only the essentials of the relationships between previously shown seals but with the introduction of an alternative piston which may be increased or decreased in in width.
FIG. 20 is a section through an amplifier which utilizes two opposed pyramidal pistons to produce amplified power and movement.

It should be noted that in the species 15 that the area of the space occurring at the interface or the knife edge 18 varies not as the area (by the square of the side) but simply directly; this has implications which makes possible using the device as an amplifier which is shown in FIG. 20.

If a wedge-shaped piston 76 in FIG. 8 is substituted for the pyramid-shaped piston 14 of FIG. 1 the cams 12 of FIG. 1 will have to be modified as to profile; all other features of species 15 may remain unchanged except the seal 22. This must be replaced by the sealing mechanism 52 shown in FIG. 7. The seal 52, as can be seen from this exploded assembly view consists of a plate 60 which is analogous to the plate 54 of FIG. 6 and, in addition, a plate 60*a* which, in turn, is analogous to plate 54*a* in FIG. 6. The difference between the sealing mechanism 22 and its analogy, seal 52 lies solely in the fact that the apertures 44 and the knife edges 18 of seal 22 are replaced in seal 52 by rectangular apertures 72 and knife edges 74. In plates 60 and 60*a* the apertures 72 are wider than the wedge piston 76 by an amount just sufficient to prevent actual sliding friction between the knife edges 74 and the surfaces of the wedge piston 76. The length of the aperture 72 is sufficient to allow one upturned knife edge 74 to stay within working proximity (the clearance mentioned above in connection with the width of the aperture 72) and the other downturned knife edge 74 to stay within working proximity at the same time to allow adequate travel to each of the seals 60 and 60*a* to clear the sides 88 of the wedge piston 76 as shown in FIG. 8.

The type of piston 78 in FIG. 9 has a curved side 80, made to any unique curve from which it is desired to generate a function.

The tapering piston 82 of triangular cross-section, FIG. 11, may be used in conjunction with the seal 58 of FIG.

10. In FIG. 10 the seal 54a from FIG. 6 is illustrated in assembled relationship with a straight sided seal 56. This seal 56 is analogous to seal 54 of FIG. 6 except that instead of the knife edges 18 of FIG. 6 one knife edge 68 is formed to mate with the hypotenuse 86 of the piston 82 while the two sides 84 of the piston 82 are sealed by the knife edges 18 of the plate 54 in FIG. 10.

In most of the anticipated uses of the species 15 of FIG. 1 together with the alternatively shaped pistons shown the fact that a certain small leakage is permitted serves a useful purpose, since pressure is regulated to a certain fixed level in the chamber 46. It is necessary to have some kind of a bleed opening in such a chamber. However, the area open to leakage varies directly with the perimeter of the piston being used. In case a bleed which is either constant or varies differently is needed this may be effected by modifying the working contours of the cams 12 accordingly.

In FIG. 13, showing the application of the invention to extract the square root of an input pressure and produce the output as pressure, the species 15 of FIG. 1 is shown (being a section taken along the lines 13—13 of FIG. 1). Next to the species 15 another species 17 is shown; the species 17 is identical with species 15 except that the wedge piston 76 of FIG. 14 and FIG. 8 is used, with appropriately modified cams 12 of FIG. 4 and FIG. 1, in place of piston 14 and the cams 12 of those figures. In the species 17 the wedge-piston 76 is seen from its side (tapering side rotated 90°).

In addition to the species 15 and species 17 just mentioned in connection with FIG. 13 it will be seen that these species 15 and 17 and several other components are mounted upon a board 102; this board 102 is shown to be demarked by a hypothetical line 162 which places all of the components to the left of the line 162 in the category, "Master-Pressure to Distance" according to the legend printed with brackets at the top of FIG. 13. In like manner all of the components mounted on the board 102 to the right of the line are marked by a similar legend "Slave-Distance to Pressure."

On the "Master" side of the computer shown in FIG. 13 a pneumatic or hydraulic cylinder 106 is shown which has a pressure inlet 104 and a shaft seal 108, which fits and seals a reciprocating shaft 110. The shaft 110 is an extension of the shaft 2 shown in FIG. 1. The shaft 110 is branched into an arm 112 which is the transmission servo means. Ignoring, for the moment, all other components, then: if the chamber 46 is supplied with pressure regulated fluid from the inlet 32 (which also feeds into the analogous chamber 46a of the species 17) and the cylinder 106 is fed fluid under pressure from the inlet 104, the piston 110 will take a position with respect to linear travel or displacement between the two pressure cylinders 15 and 106 resulting from the force balance between them. This force balance is equal to the pressure in the cylinder 106 (the input-variable) times the constant area of the piston 110, which is equal to the constant, regulated pressure in the chamber 46 of the cylinder 15 times the variable area of the piston 14 at the interface of the seal 22. As has been already mentioned, the area of a pyramid varies with the square of its side while its sides vary directly with its altitude.

If the arm 112 of the piston 110 were to be formed into a scale of uniformly spaced graduations and the scale were placed parallel to the shaft 110, the pointer would respond to a change in the pressure in the cylinder 106 by moving along the scale in proportion to the square root of the pressure. Then, suppose, the piston 14 of the cylinder 15 is replaced by the wedge-shaped piston 76 of FIG. 8 and FIG. 14, in which the area varies directly (not as the square) of the side width; the travel of the pointer would move proportionally to the input pressure itself. The corresponding interface areas 90 and 92 of the pistons 14 and 76 of FIG. 14 will vary as do a number and its square root. The purpose of FIG. 14 is to recapitulate in graphical form the foregoing description. In this figure the base dimension of the wedge piston 76 is .1.′ by 5″ while the corresponding base dimension 98 of the pyramid piston 14 is 5″ by 5″. The small end 94 of piston 14 is .1″ by .1″ as is the small end 96 of piston 76. This dimension .1″ by .1″ is also the dimension of the shaft 110 and 158. The two pistons 14 and 76 are of course of equal length. Now, if, as already described, the "Master" part of the device establishes a position or locus as a result of pressure input in the cylinder 106, and if the cylinder 17 containing the piston 76 is placed along side of the cylinder 15 so that the pistons 14 and 76 are in exact juxtaposition to each other, then it is obvious that the force resulting from the same regulated pressure in the chamber 46 and 46a times the interface area 90 at a distance "D" in FIG. 14 will be equal to the square of the value of the pressure 46a times the area of the interface 92 in FIG. 14 at a distance "D." The purpose of the arm 112 in FIG. 13 will now be seen to operate valving (which will be described presently) to pressurize a cylinder 146 analogous to cylinder 106 and to counteract the force generated by the wedge piston 76. A shaft 158, analogous to the shaft 110 is sealed in this cylinder by the seal 152. If the pressure in cylinder 106 is exactly the square of the pressure in cylinder 146 then both piston 14 and piston 76 will be in exact juxtaposition to each other with their corresponding interface areas 90 and 92 of FIG. 14 in ratio of square and square root respectively. If the pressure in cylinder 106 rises above the value at which the pressure in cylinder 146 is its square root, the arm 112 will open a valve until the pressure is corrected in the cylinder 146; if the pressure value in cylinder 106 falls below that at which the pressure in cylinder 146 is its square root, the arm 112 will open a valve to exhaust enough fluid in cylinder 146 until the prescribed values are restored.

The valving and pressure controls for the cylinder 146 of FIG. 13 may be described as follows: Arms 154 and 156 branch out from the shaft 158 as shown. The arm 154 is fastened to the end of a bellows 118 while the other end of the bellows 118 contacts the arm 112 of the "Master," previously mentioned, the bellows 118 is sealed except for a capillary tube 124 which terminates at its other end in a similar sealed bellows 128. This assembly of the bellows 118, the tube 124 and the bellows 128 are preferably made of polypropylene, a plastic material having a long flexural life and the whole assembly is filled with an incompressible fluid.

The arm 156 is fastened to the base of another bellows 120 which is identical to the bellows 118 just described. The bellows 120 is a member of an assembly which is identical to the one just described, which includes a plastic capillary tube 122 terminating at its other end in a bellows 126 which is identical with the bellows 128 described in the analogous assembly. The arm 154 has a projection 116 and the arm 156 has a like projection 114. These two arms 154 and 156 together with their projections 116 and 114 form a cage or enclosure which hold the bellows 118 and 120 in such a way that there is no room for idle play between the ends of either of the bellows 118 or 120 and the arm 112; however the arm 112 may move in a direction up or down on the drawing, in so doing either compressing or expounidng the bellows 118 and 120. The projections 116 and 114 serve as motion limiters. Two amplifier valves, generally indicated by the reference numerals 140 and 140a serve as an exhaust valve and an inlet valve, respectively, for the cylinder 146. These amplifier valves 140 and 140a are described in U.S. Patent 2,880,959 issued to me; they are shown here in somewhat simplified form. Basically the valves 140 and 140a are identical and consist of a housing 147 and 149 having long tapering pistons 164 and 164a which slidably reciprocate in conformingly shaped sockets, inlets 145 and 143 are provided as are main outlet valves and seats 166 and 166a. Control valves 168 and 168a are shown. In operation if the control valves 168 and 168a are closed the pistons 164 and 164a will be held down either by a spring (not shown) or by hydrostatic force of the fluid under pressure from the inlets 143 and 145. If the control valves 168 and 168a are opened the pressure above the large end of the tapered pistons 164 and 164a will be reduced and the pistons 164 and 164a will rise until the flow capacity of the space between the tapering pistons and the sockets in which they rest equals the capacity of the control valves 168 and 168a. The action of the valves is fully modulated between open and closed positions. The gain of these servo valves is high and they are inherently non-resonant in action (as the tapering pistons rise the effective piston area increases if the inlet pressure supply is adequate). The inlet 145 enters the amplifier valve 140 from the cylinder 146 as exhaust through the conduit 148. The inlet 143 enters the amplifier valve 140a from a compressor or pump 142. The outlet 160 of the amplifier valve 140 may go either to the atmosphere in case of compressed air being used as an operating medium or to a reservoir in case of hydraulic operation. The outlet 144 of the amplifier 140a enters the cylinder 146 as its pressure source. The amplifier 140 is provided with an extension or arm 138 which serves as a base for attachment of the bellows 126 while a similar arm 136 projects from amplifier valve 140a to serve as an attachment base for the bellows 128. A lever 132 is pivoted to the board or chassis 102 by an idle shaft 130; the lever 132 is formed into pads or buttons 134 while the opposite end of the lever serves as a closure or cover for both control valves 168 and 168a. There is no idle play between the ends of the bellows 126 and 128. Both of the bellows 126 and 128 are the same size and they are preferably made smaller than the bellows 118 and 120 at the other ends of the tubes 122 and 124 so that the movement of the larger bellows will be amplified. The power requirements of the valve controls 168 and 168a are negligible.

The operation of the square root computer of FIG. 13 may now be described, giving pressure values and dimensions purely as an example. If the regulated pressure in chambers 46 and 46a is maintained at 1 p.s.i.g. and if 2500 p.s.i.g. is the inlet pressure in the cylinder 106 the piston 14 will be pushed downward as far as the largest interface 90 which is 5" x 5"; this is the maximum computing ability of the device at the 1 p.s.i.g. level of chamber 46 and 46a. The ratio of the piston area maximum of piston 14 to the cross-sectional area of the shaft 110 is 2500:1. As the arm 112 moves downward to assume this position the bellows 120 is compressed, forcing the sealed fluid through the tube 122 into the bellows 126 and expanding the bellows 126 thereby tilting the lever 132 to close the control valve 168 to the amplifier 140. The exhaust to the cylinder 146 is cut off as the piston 164 closes the main valve 166. The control valve 168a is simultaneously opened so that fluid is allowed into the cylinder 146 as the tapered piston 164a opens the main valve 166a of the amplifier 140a. The ratio of the largest area of the wedge piston 76, hence the largest possible interface 92, is 50 to 1; therefore the shaft 158 will stop moving downward when 50 p.s.i.g. is reached in the cylinder 146. If greater pressure exists in the cylinder 146 the movement of the arm 154 beyond its intended position with respect to the arm 112 of the master the bellows 118 would be compressed. The fluid in this bellows would then be forced into the bellows 128 through the tube 124. The lever 132 would pivot to reverse the action described in admitting fluid into the cylinder 146. In actuality the maximum base dimensions of the pistons 14 and 76 would have to be greater than that shown in the drawings if the example just given of 2500 p.s.i.g. input and 50 p.s.i.g. output is used but the base dimension shown, for this example may be taken as the maximum effective or intended interface areas 90 and 92. While it may seem that the slave members as shown may act as a drag upon the master and so, instantaneously at least, cause a spurious output or lag, the actual quantitative disparity is negligible when the effective response time of the amplifiers and their high gain is considered. The two tubes 124 and 122 are shown as randomly formed loops here; since the polypropylene of which they are composed is highly flexible, resistance is minimal. Also, since the pressure in the tube is low there is no reststance due to the "Bourdon tube" effect of inflation.

While the preceding description in connection with FIG. 13 dealt with the extraction of the square root, it should be evident that the reverse effect will obtain if the cylinder 17 with its wedge-shaped piston placed where the cylinder 15 with its pyramid piston 14 is located in FIG. 13 and vice versa; under the example described, therefore, if the pressure value at the input were to be 50 p.s.i.g. the output could be 2500 p.s.i.g. The simplest functions have been chosen for illustration but it should be evident that generation of other functions is made possible by the simple tools of this invention, the provision of a sealing device which conforms to pistons of various geometrical forms. It would, therefore, be impracticable to enumerate all the possible combinations which can be made.

Figure 15:
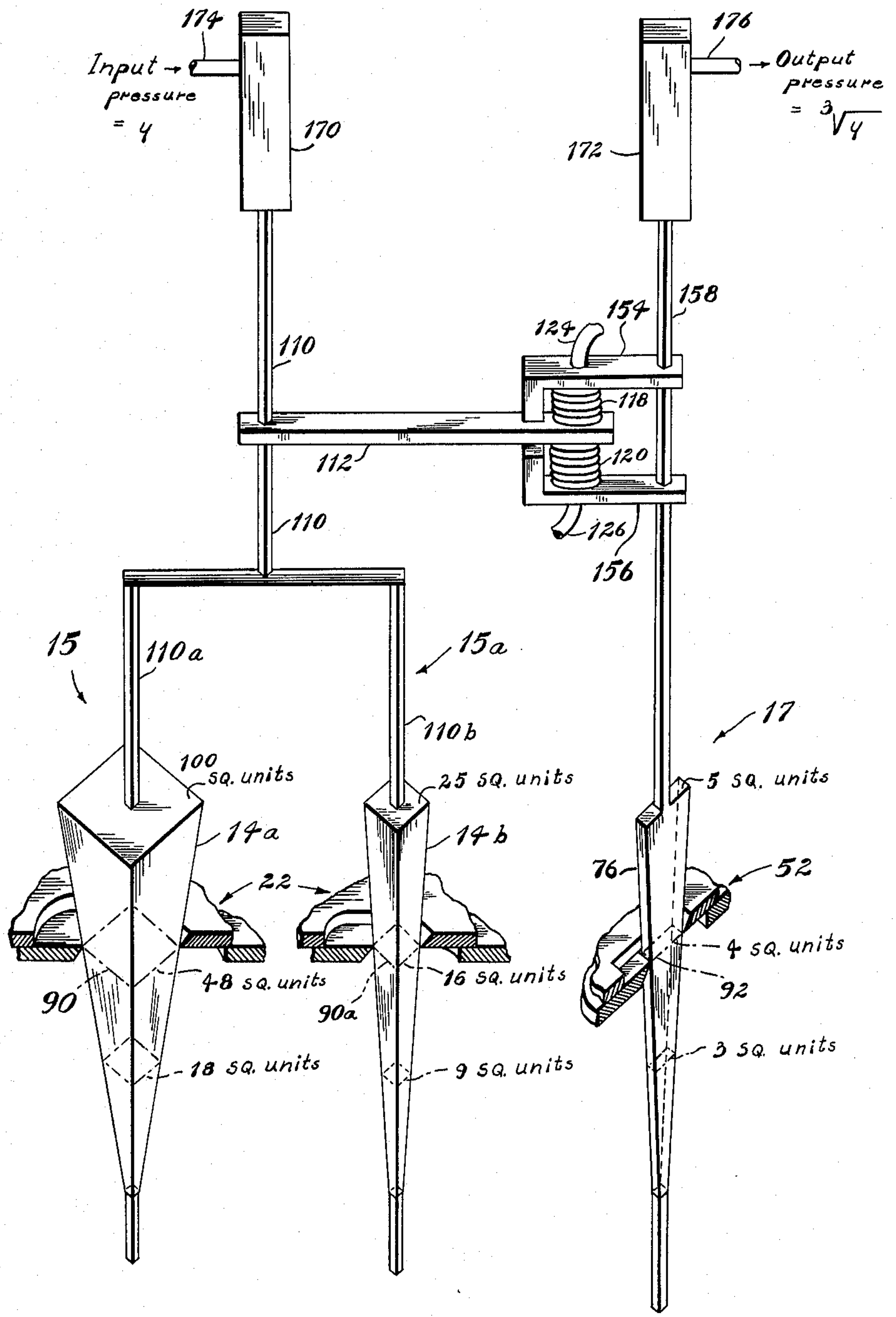
FIG. 15 is a perspective view which diagrammatically illustrates the extraction of the cube root of a pressure.

In FIG. 15 some of the structures described in FIG. 13 will be recognized with modifications adapting this species of the invention to extraction of the cube root. In FIG. 15 the conduit 174 is an inlet into a cylinder 170 which is analogous to the cylinder 106 of FIG. 13. A cylinder 172 is analogous to the cylinder 146 of FIG. 13. The shaft 110 of FIG. 13 has the arm 112 to control the valving to the output amplifiers (not shown) 140 and 140a. The shaft 110, instead of being attached to one pyramid-shaped piston 14 as in FIG. 13, bifurcates to become two shafts 110a and 110b. Reference numeral 15 generally indicates the structural scheme of species 15 of FIG. 1 and FIG. 13 without the housing; the piston 14a being analogous to piston 14 of FIG. 13. Reference numeral 15a generally indicates a functional scheme of the previous species 15, the piston 14b, also being like piston 14 of FIG. 13. Reference numeral 17 refers generally to the identical shaft and piston assembly of FIG. 13 except without the housing. However, the essentials of understanding are believed to be present in FIG. 15 in view of the fact that FIG. 15 is but an extension of the same concept embraced by the structure of FIG. 13. Note in FIG. 15 that the previously shown sealing devices 22 and 52 are shown and that the interfaces 90, 90a and 92 are related to the prior descriptions. Note also the legends calling out the interface areas at the same altitudes of each of the pistons 14a, 14b and 76; thus the base of each of these pistons are 100 sq. units, 25 sq. units and 5 sq. units, respectively. Since the pistons 14a and 14b are connected rigidly to the same shaft 110 by means of the bifurcation the force derived from the regulated pressure against their interfaces will be additive. Thus, the largest interfaces 100 and 25 when added will be equal to the cube of 5. At the next interfaces down 48 sq. units added to 16 sq. units is equal to the cube of 4 sq. units of the piston 76. Therefore, by the same valve actuation by the arm 112 working the bellows 118 and 120 in FIG. 13 the pressure generated in cylinder 172 will be equal to the cube root of the input pressure in cylinder 170.

Figure 16:
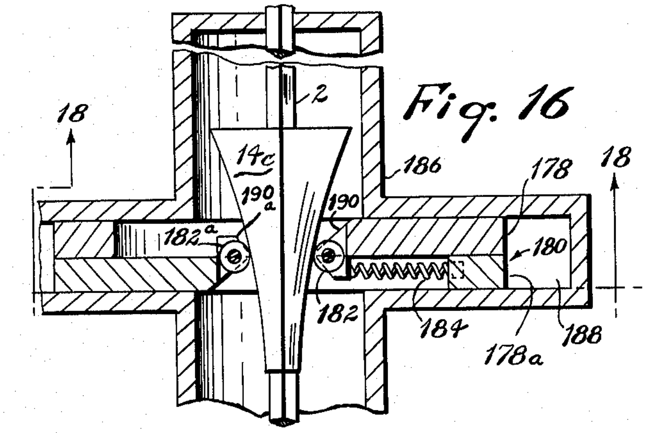
FIG. 16 is a section a species similar to that depicted in FIG. 1 showing an alternative means of operating the seal jaws, particularly when the pyramidal walls of the piston depart from a straight line.
Figure 17:
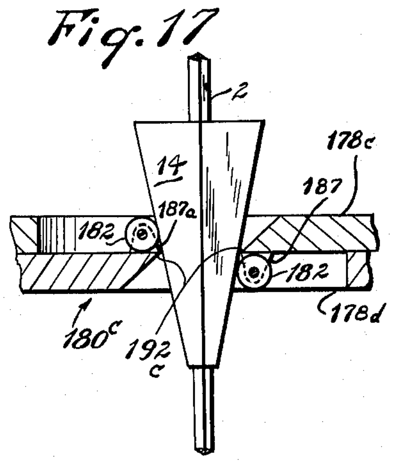
FIG. 17 is a section similar to the section shown in FIG. 16 (not repeating obvious details) in which a straight pyramidal piston is shown with alternative seal actuating means.

In certain cases it may be unnecessary to operate the seal 22 of FIG. 1 by means of the cams 12; more leakage may be permitted across the interface, for instance, or the shaped piston may be permitted to be exposed to the wear of rollers directly on its sides or corners. Such cases as these are shown in FIG. 16 and FIG. 17, which present alternative designs for the seal in FIG. 1. In FIG. 16 a housing 186 contains a reciprocating shaft 2 attached concentrically to which is a piston 14c which is rectangular in cross-section but whose sides are curved. A seal is generally indicated by the reference numeral 180 which in turn is made up of two identical plates 178 and 178*a* like the plates 54 and 54*a* of FIG. 6 except that the rollers 182 and 182*a* held by slotted lugs 190 and 190*a* contact the corners of the piston 14*c* instead of the cams 12 of FIG. 1. The two identical plates slide in the space or slot 188. A compression spring 184 held at one end by a hole 189 in plate 178*a* and pressing against the lug 190 of the plate 178 at its other end causes the rollers 182 and 182*a* to maintain contact with the piston 14*c*. Knife edges 192 (visible in FIG. 18) approach the sides of the piston 14*c* to form a seal. Sealing rings like those shown at 20 in FIG. 1 may be used but are not shown here. Note that the rollers 182 and 182*a* are mounted in such a position that their centers are exactly on the contiguous, common, surface of the plates 178 and 178*a*; this is essential if the sides of the piston 14*c* are curved. In FIG. 17 if a straight sided pyramid piston 14 from FIG. 1 is used a more complete seal is made because the sealing plates 178*c* and 178*d* which make up the seal, generally identified by the reference numeral 180*c*, may each be provided with a slotted lug 187 and 187*a*, respectively, which lugs, may be offset as shown so that no slot interrupts the knife edges 192*c* to permit leakage.

In FIG. 19 a seal and piston assembly is generally indicated by reference numeral 199. This assembly is made up of a pair of sealing plates, generally indicated by reference numeral 183 and a piston generally indicated by reference numeral 202. This assembly may be housed by a housing such as that shown in FIG. 16 as 186 which has a slot 188 in which the seal 199 may be substituted for the seal 180 of that figure. The piston 202 is of rectangular cross-section and consists of two halves 200 and 198; these halves have a common beveled surface 204 which is smooth enough to effect a seal with each other. Adjustment of these piston halves by sliding in the direction of arrows 196 and 206 will decrease the width and therefore the area of the piston decreases. The seal 183 is made up of a sealing plate 193*a* which has a roller 182*d* held to it in slotted lugs. This roller 182*d* contacts the side of the piston 202. An identical seal 193 is joined to the sealing plate 193*a* so that the knife edge 192*a* of sealing plate 193 is downward in the drawing while the corresponding knife edge 192*a* of sealing plate 193*a* is upward. This sealing unit 183 is analogous to the seal 52 of FIG. 7 with respect to its knife edges and analogous to FIG. 17 with respect to its rollers 182 and 182*d*, while a means of urging the rollers 182*d* against the piston 202 similar to the spring 184 of FIGS. 17 and 18 may be provided. A shaft 191 seen attached to the piston half 200 is of the same functional purpose as the shaft 2 of FIGS. 17 or 16. Two slots 197 are milled or formed into the half piston 200 which have a shoulder against which two shoulder or cap screws 195 bear. The cap screws 195 hold the piston half 200 to the other piston half 198, the latter being tapped to receive them. The outer walls 201 and 203 need not be straight or parallel as shown; also, the means of adjusting the piston area may be automatic. Mainly, the use of this species 199 as shown in FIG. 19 is to provide a piston and seal of adjustable area for use in division or multiplication in computers.

In FIG. 20 the piston and sealing structures of this invention are shown adapted to a fluid amplifier. In this figure a housing 220 encloses slots 211 and 213 which are analogous to the slot 47 of FIG. 1 and FIG. 3 and in each of which seals 22*d* operate in the same manner as the seal 180*c* of FIG. 17. Actually, in FIG. 20 the details such as rollers to prevent the rubbing of a seal against pistons are not shown here; it is believed that the different forms in the preceding figures are amply described and pictured so that the substitution of one alternative for another lies well within the skill of the art. The housing 220 encloses, also, the chambers 209, 224, 234, and 238.

Shaft bearings 248, 223, and 226, the latter of which is "blind," are formed in the end walls of the chambers just mentioned to provide bearing and, where necessary, sealing surfaces for a shaft 228. The shaft 228 has fastened coaxially to it two pyramid-shaped pistons 232 and 230 which are sealed by the knife edges 18*d* of the seals 22*d*. A pump 212 has an intake 215 and an outlet 217 into the chamber 209. A vent conduit 244 leads from the chamber 234 to an orifice 252; a similar vent conduit 218 leads from chamber 224 to a similar orifice 250. Between the two orifices 252 and 250 a leaf 214 pivoted at 219 is placed in such a way that if it moves to the left it closes the orifice 252 and if it moves to the right it closes the orifice 250. The leaf 214, the conduit ends 244 and 218 are closed from the outside by a housing 208. The only other opening to the housing 208 is the previously mentioned inlet 215 to the pump 212. If the pump 212 is turned on to bring fluid from the interior of the housing 208 (a reservoir, not shown, may, in practise adjoin the hydraulic circuit; for this description it will be imagined that leakage to the outside of the device is nil) and so to pressurize the chamber 209 and if the leaf 214 is exactly in the center between the two orifices 252 and 250 the two pistons 232 and 230 will also be placed exactly at mid-position. This is because the pistons 230 and 232 are identical in shape and size and the leakage at the interface of the pistons and the seals 22*d* on either side will be equal; this, in turn, results from the fact that the orifices 252 and 250 are opened the same amount and therefore the flow from each is the same. If the leaf 214 is displaced from center position the flow out of one orifice is reduced, while the flow out of the other orifice is increased; if the flow from orifice 252 is restricted the pressure in chamber 234 is increased, as a result of which, the piston 232 is forced to the right. The pressure in the opposite chamber 224 is decreased since, in moving to the left, the flow from the orifice 250 was increased. Attention was called to the fact that the interface flow area varies directly as the displacement of a pyramid-shaped piston earlier in this description and at the same time the pressure varies as the square of the side dimension of the pyramid at the interface. The response time of the pistons to attain pressure equilibrium by moving according to the movement of the leaf 214 is high; the thwarting of harmonics in a pyramid piston with conforming seals is good because direct proportionality of restoring force is absent.

In FIG. 20 a bellows, preferably composed of some material having high flexural characteristics and close to zero spring rate, is shown at 238. The bellows 238 is cemented or otherwise sealed and fastened to the shaft 228 at one end 236 (shown broken away); it is fastened in a similar way to a wall of chamber 234 at its other end 221. Thus, it will be seen that between the bellows 238 and the other end of the apparatus, the bearing 226 for the shaft 228 there is provided a completely sealed fluid mechanism; the pump 212 may be of the diaphragm type which is available on the market. Such an amplifier or fluid motor as is described has advantages: (1) a precious fluid may be used without appreciable leakage; (2) fluid contamination is eliminated or greatly reduced so that blockage of the orifice control is lessened. The function of the bellows 238 is, therefore, to seal the chambers 234, 209 and 224 as well as that enclosed by the housing 208 and the various conduits. However, since the pressure of the fluid sealed in by the bellows would most likely be great enough to rupture the bellows, a counter pressure device maintains a pressure on the outside of the bellows in chamber 246 which is equal to the pressure in chamber 234. The pressure medium in chamber 246 may be compressed air and may be permitted to leak somewhat between the shaft 228 and its bearing 248. The counter pressure apparatus and its operation may be described as follows: a conduit 236 leads from chamber 246 to a diaphragm operated regulator 210. A conduit 240 leads to the upper side or motor force of the diaphragm of this regulator. The origin of the conduit 240 is the chamber 234 (actually, in the drawing it is shown branching from the conduit 244 which leads, in turn, from chamber 234). The pressure supply to the regulator 210 is extraneous to the rest of the device shown here.

The fluid amplifier just described in connection with FIG. 20 is controlled by a leaf 214 controlling the area of orifices 250 and 252 which are uncovered and which results in movement of the shaft 228 to the left or right being amplified both as respects distance and power developed over the movement of the leaf. However, this species of the invention is adaptable to a different type of control. A viscous fluid in which finely ground iron carbonyl particles of 1 to 8 microns in size is available from the Union Carbide Co. Fluids of this type have been described in several patents, one of which is the Rabinow magnetic particle clutch. If such a fluid is used in the enclosed chambers 209, 234, 224, etc., the two electromagnets 216 and 242 which are placed about the conduits 218 and 244 respectively and the leaf 214 may be removed or dismantled. The variation of the magnetic field's strength may, therefore, be used to change the viscosity, or more properly, the apparent average viscosity of the fluid in the conduits 244 and 218, and, hence, the flow from the orifices 250 and 252. Since the carbonyl iron particle and fluid mixture described is not homogenous the size of the particles must be closely controlled and the diameter of the conduits 244 and 218 must be large enough and the magnetic field long enough so that the error due to the non-homogeneity of the fluid will statistically average out. Work is being done by several firms to improve upon similar fluids, however, to remove some of the disadvantages of this fluid.

Figures 21, 22, 23:
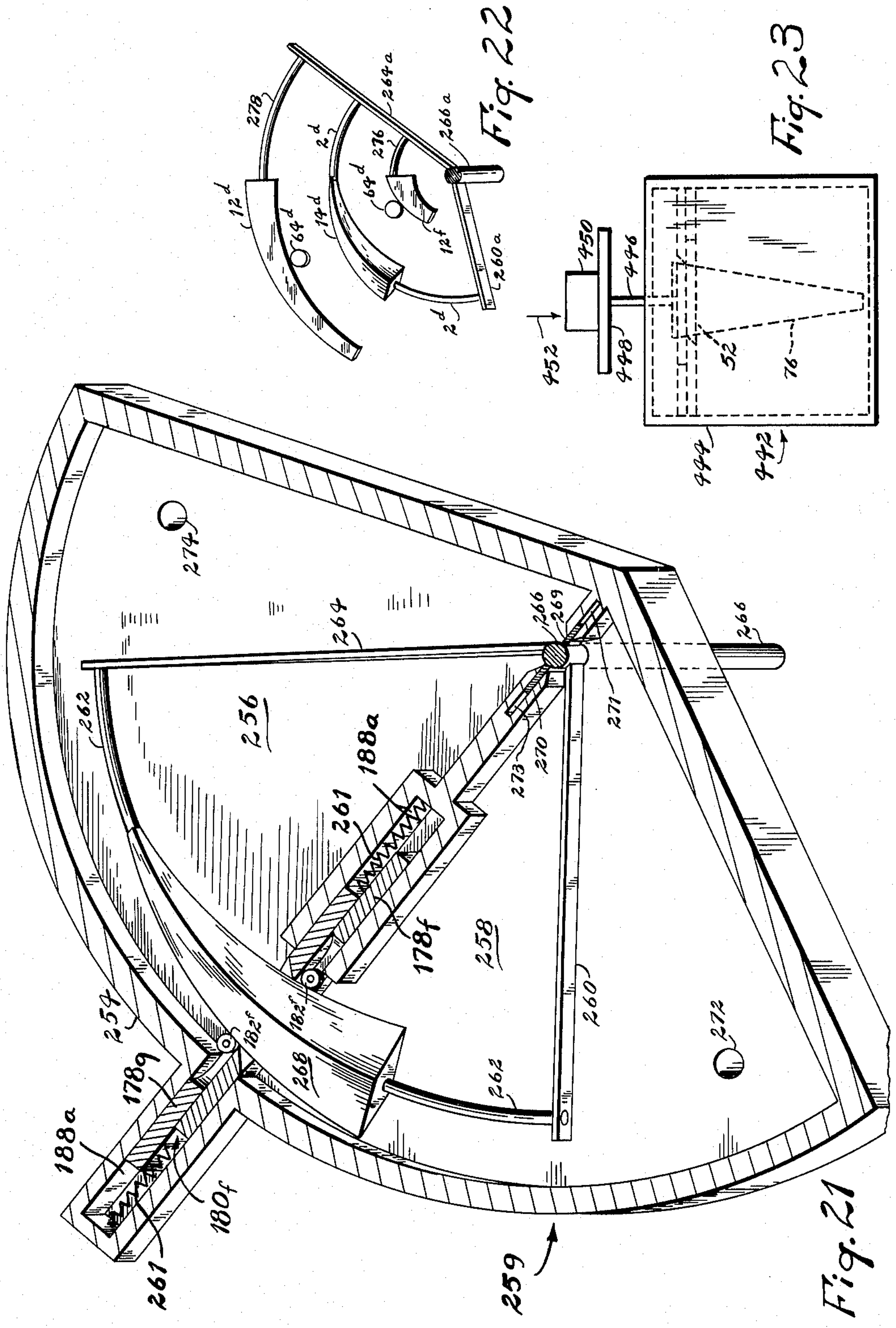
FIG. 21 shows a perspective view of another species which uses the action of the previously shown seal and piston to produce rotary motion. This view is taken from almost directly above the unit and the unit has been sectioned at its middle.
FIG. 22 shows a perspective view of a pyramidal-shaped piston and its cams and rollers. This, as may be seen by reference to FIG. 4, is perfectly analogous to FIG. 4, the only difference being the fact that the axis through the pyramid-shaped piston and the cam of FIG. 4 is rectilinear and that the corresponding axes are circular in FIG. 22.
FIG. 23 is a side elevation of a generic concept of the invention generally illustrating the force-travel or displacement and the displacement-force function of the invention.

FIG. 21 shows a shaped piston and seal structure differing very little from the previous species disclosed in this application. FIG. 21 and FIG. 22 should be examined together for the best understanding of the species of the invention which is generally indicated by reference numeral 259 in FIG. 21. If we were to take the species 15 of FIG. 1, for instance, and modify it so that the rectilinear axis of the shaft 2 becomes an arc and modified shaft 2*d* of FIG. 22 revolves about the center of the pivot shaft 266*a* of FIG. 22 then it should be quite clear that the assembly of FIG. 22 is simply an arcuate equivalent of a rectilinear structure of FIG. 1. The other, specific equivalents are as follows: cams 12 of FIG. 1 equal cams 12*d* and 12*f* of FIG. 22; piston 14 of FIG. 1 equals piston 14*d* of FIG. 22; cam followers or rollers 64 of FIG. 1 equal cam followers 64*d* of FIG. 22. To those skilled in the art it should be evident that this same rectilinear-arcuate equivalance is applicable to the shafts and related pistons of all of the alternative species disclosed in FIGS. 1 through and including FIG. 22. As a matter of fact this may be demonstrated without respective drawings by simply looking upon, for instance, the shafts 110 and 158 and the cylinders 106 and 146 and 15 and 17 of FIG. 13 as having an arcuate axis which has been "straightened out" in a "developed view" as a legitimate perogative of drafting practice. The remaining structural numbers of FIG. 22 are the connecting links 278, 276, 264*a* and 260*a* which serve to join the shaft, piston, cams, and cam followers just described to the pivot shaft 266*a* which transmits rotary displacement and power.

Returning to FIG. 21 and the reference numeral 259 indicating an arcuate species, a housing 254 is shown sectioned at its middle. The housing 254 encloses a chamber 258 and another chamber 256 as well as a slot 188*a*. The slot 188*a* forms the sealing ways or track in which a seal 180*f*, analogous to the seal 180*c* of FIG. 17, is located. The seal 180*f* comprises two identical plates 178*f* and 178*g* which are comparable exactly to plates 178*c* and 178*d* of FIG. 17. The plates 178*f* and 178*g* are provided with the lug-mounted rollers 182*f* which are identical to rollers 182 of FIG. 17. Springs 261 are provided to urge each of the plates 178*f* and 178*g* toward the pyramid piston 268 by each pressing against the wall of the housing 254 and the end of the plates 178*f* and 178*g*. An arcuate shaft 262 is provided which is coaxial to the piston 268. The ends of the shaft 262 are joined to rigid connecting links 260 and 264 which join rigidly a pivotal shaft 266 which extends through a sealed bearing (not shown) in the housing 254 and may be seen cutting through the housing 254 and extending downward. Power, for whatever use desired, may be derived from this shaft 266. Vane type seals 269 and 270 are shown sliding against the shaft 266 to seal chamber 258 from chamber 256. The grooves 271 and 273 retain the vane 269 and 270, respectively. Fluid entrance and exit may be made to openings 272 and 274 in the housing. It should be evident to those skilled in the art that the structure shown in FIG. 22 or any other piston and seal variations previously shown may be adapted to used in the species 259 of FIG. 21. The type of cam operated seal of FIG. 1 and FIG. 22, however, provides a more perfect seal than that shown in FIG. 21 because, as was previously pointed out, if the piston has curvature to its walls and the rollers are off-set, the leakage width will change with piston stroke.

The illustration of FIG. 23 is intended to show a principal species of the invention as a generic or more universal force measuring instrument irrespective of the cause of the force. Reference should be made again to FIG. 1 or FIG. 13 and the accompanying text since the operation is the same in both cases. The species as a measuring instrument is generally indicated by the reference numeral 442 in FIG. 23 in which a housing 444 is provided which together with its sealing mechanism 52 and its wedge piston 76 is the same as the species 17 of FIG. 13. In addition a shaft 446 replaces the previous shaft 158. A weight representing a force in the direction of the arrow 452 is shown by reference numeral 450. A platen 448 is attached to the shaft 446.

Having described several forms of the invention, it is to be understood that the principles of the invention can be effectuated by other specific arrangements, and that all such are included in the scope of this invention as fall within the true spirit and meaning of the appended claims.

What is claimed is:

1. In a pneumatic or hydraulic device comprising a cylinder housing, a piston, a piston rod and a sealing device for sealing the periphery of said piston relative to said cylinder housing, said sealing device comprising a plurality of plates encompassing said piston, said plates having contiguous surfaces mutually sealing each other thereby, said plates having in addition and substantially parallel to said contiguous surfaces mutually sealing each other, surfaces contiguous with and sealing from adjoining surfaces of said cylinder housing, said plates movably located in a recess in said cylinder housing, said recess and said plates being substantially normal to axis of movement of said piston, said recess forming a seal with sides of said plates, said plates having interface edges conformably shaped to mate said piston to form a substantial seal thereby at said interface edges, said interface edges of said plates overlapping each other in such manner that said plates may slidably move toward and away from the central axis of said piston along their said contiguous surfaces in such a manner that said interface edges of said plates maintain a required distance from the sides of said piston even though the periphery of said piston is of inconstant dimension and a means provided for causing said plates to move to maintain said required distance.

2. Claim 1 wherein roller follower and cam surfaces provide the means of maintaining a required distance between said interface edges of said plates, spring means is provided to urge said plates toward said sides of said piston and fluid forces against said plates are balanced essentially with respect to moving said plates toward and away from said sides of said piston.

3. Claim 2 wherein supplementary means is provided to encircle said interface edges of said plates, thereby sealing said contiguous surfaces of said plates mutually and also from said adjoining surfaces of said cylinder housing.

4. Claim 3 wherein said sealing device is interposed between a first chamber having a fluid communication to the outside of the said cylinder and a second chamber having a fluid communication to the outside of said cylinder.

5. Claim 4 wherein said piston varies in the cross-sectional area of planes cutting normal to said central axis of said piston and at different points located on said central axis, said piston when geometrically shaped to represent a mathematical function called hereafter analog piston.

6. Claim 5 wherein analog piston is connected to pressure regulator so that force developed by said analog piston regulates pressure in said pressure regulator.

7. Pneumatic or hydraulic apparatus as defined in claim 5 wherein fluid under pressure is admitted to said first chamber, the end of said analog piston decreasing in cross-sectional area extending into said first chamber and the opposite end of said analog piston increasing in cross-sectional area extending into said second chamber, a means provided to control the escape of the fluid from said second chamber in variable manner, said fluid in said second chamber having leaked through the space between said analog piston and said interface edges of said plates from said first chamber, the area of said space between said analog piston and said interface area of said plates constituting a variable area restriction upon movement of said analog piston, the force balance between the said first chamber and said second chamber resulting from the operation of said means provided to control the escape of the fluid from said second chamber acting to position said analog piston.

8. In a hydraulic or pneumatic device, a housing having two chambers, a variable area piston movable between said chambers, and a sealing device effecting a seal to restrict the escape of fluid between said chambers, said sealing device comprising parallel plates, said plates overlapping to provide an interface seal relationship with said variable area piston substantially in one plane.

9. In a hydraulic or pneumatic device as defined in claim 8, means to move said parallel plates to maintain said seal relationship when said variable area piston changes position.

10. The device of claim 9 wherein roller and cam means are used for maintaining the required distance between the edges of said parallel plates.

11. The device of claim 8 wherein supplementary sealing means is provided to encircle the passage for said variable area piston in said parallel plates.

12. The device of claim 8 wherein said piston varies in the cross-sectional area of planes cutting normal to said central axis of said piston and at different points located on said central axis, said piston, when geometrically shaped to represent a mathematical function which will be called hereafter analog piston.

13. The device of claim 8 wherein said variable area piston is connected to a pressure regulator so that said analog piston regulates the pressure in said pressure regulator.

14. The device of claim 8 where said hydraulic or pneumatic device is built in modular form.

References Cited by the Examiner

UNITED STATES PATENTS

| | | | |
|---|---|---|---|
| 239,127 | 3/1881 | Wellman | 92—6 |
| 1,961,438 | 6/1934 | Winter | 277—174 |
| 2,567,603 | 9/1951 | Hogue | 92—61 |
| 2,649,077 | 8/1953 | Mehm | 92—120 |
| 2,962,003 | 11/1960 | Ransom | 92—61 |
| 2,986,125 | 5/1961 | Young et al. | 91—357 |
| 2,996,049 | 8/1961 | Huska | 92—120 |
| 3,138,168 | 6/1964 | Waller | 137—82 |
| 3,174,499 | 3/1965 | Mott | 137—82 |

LEO SMILOW, *Primary Examiner.*

C. G. COVELL, *Assistant Examiner.*